United States Patent
Alesso et al.

(10) Patent No.: US 7,204,498 B2
(45) Date of Patent: Apr. 17, 2007

(54) TWIST-BEAM AXLE FOR THE REAR SUSPENSION OF A MOTOR VEHICLE AND METHOD FOR ITS PRODUCTION

(75) Inventors: Guido Sebastiano Alesso, Savigliano (IT); Daniele Bussolino, Turin (IT)

(73) Assignee: Sistemi Sospensioni S.p.A., Corbetta (Milano) (IT)

( * ) Notice: Subject to any disclaimer, the term of this patent is extended or adjusted under 35 U.S.C. 154(b) by 0 days.

(21) Appl. No.: 10/534,017

(22) PCT Filed: Nov. 5, 2003

(86) PCT No.: PCT/EP03/12337

§ 371 (c)(1),
(2), (4) Date: Oct. 21, 2005

(87) PCT Pub. No.: WO2004/041564

PCT Pub. Date: May 21, 2004

(65) Prior Publication Data

US 2006/0131829 A1    Jun. 22, 2006

(30) Foreign Application Priority Data

Nov. 7, 2002  (IT) .......................... TO2002A0959

(51) Int. Cl.
*B60G 9/04* (2006.01)
(52) U.S. Cl. .................. 280/124.106; 280/124.128; 280/124.132; 29/897.2
(58) Field of Classification Search ......... 280/124.106, 280/124.11, 124.111, 124.116, 124.117, 124.128, 280/124.132; 29/897, 897.2

See application file for complete search history.

(56) References Cited

U.S. PATENT DOCUMENTS

| 3,767,224 | A | * | 10/1973 | Schneeweiss | ........ 280/124.128 |
| 4,165,098 | A | | 8/1979 | Wagner | |
| 4,165,099 | A | * | 8/1979 | Wagner et al. | ........ 280/124.116 |
| 4,232,881 | A | * | 11/1980 | Kolbel et al. | ......... 280/124.128 |
| 4,432,564 | A | | 2/1984 | Tronville | |
| 4,486,030 | A | * | 12/1984 | Takata et al. | ......... 280/124.107 |
| 5,324,073 | A | * | 6/1994 | Alatalo et al. | ........ 280/124.116 |
| 5,520,407 | A | * | 5/1996 | Alatalo et al. | ........ 280/124.166 |
| 5,597,175 | A | * | 1/1997 | Tuan | .................... 280/124.111 |
| 5,800,024 | A | * | 9/1998 | Steimmel et al. | ........... 301/127 |

(Continued)

FOREIGN PATENT DOCUMENTS

EP    0 743 205 A1    11/1996

(Continued)

*Primary Examiner*—Paul N. Dickson
*Assistant Examiner*—Timothy Wilhelm
(74) *Attorney, Agent, or Firm*—Sughrue Mion, PLLC

(57) ABSTRACT

The twist-beam axle (10) comprises a central cross-member (11) compliant to torsion and a pair of trailing arms (12) fixed to side end portions (11a) of the cross-member (11) for articulated connection of the axle to the vehicle body and for support of the rear wheels. Each trailing arm (12) is formed by a pair of first, transversely inner half-shells (18, 19), that is, a front half-shell and a rear half-shell, respectively, securely connected to each other and to the respective end (11a) of the cross-member (11), and by a second transversely outer half-shell (20), securely connected to the pair of first half-shells (18, 19) so as to form therewith a structure having a closed cross-section.

11 Claims, 4 Drawing Sheets

U.S. PATENT DOCUMENTS

| | | | |
|---|---|---|---|
| 5,909,888 A * | 6/1999 | Betz et al. | 280/124.166 |
| 6,047,978 A * | 4/2000 | Watanabe et al. | 280/124.106 |
| 6,059,314 A * | 5/2000 | Streubel et al. | 280/798 |
| 6,099,084 A * | 8/2000 | Bungarten et al. | 301/127 |
| 6,152,468 A * | 11/2000 | Glaser et al. | 280/124.134 |
| 6,523,841 B2 * | 2/2003 | Glaser et al. | 280/124.106 |
| 7,086,655 B2 * | 8/2006 | Chan et al. | 280/124.116 |

FOREIGN PATENT DOCUMENTS

| | | |
|---|---|---|
| EP | 743205 A1 * | 11/1996 |
| EP | 0 861 744 A2 | 9/1998 |
| EP | 861744 A2 * | 9/1998 |
| JP | 58-105815 | 6/1983 |
| JP | 58105815 A * | 6/1983 |
| JP | 11-011133 | 1/1999 |
| JP | 11011133 A * | 1/1999 |
| JP | 2000318420 A * | 11/2000 |

* cited by examiner

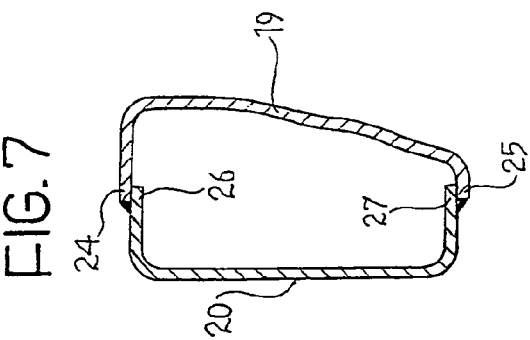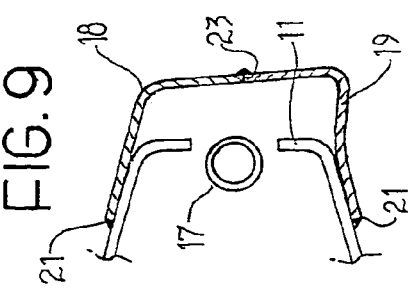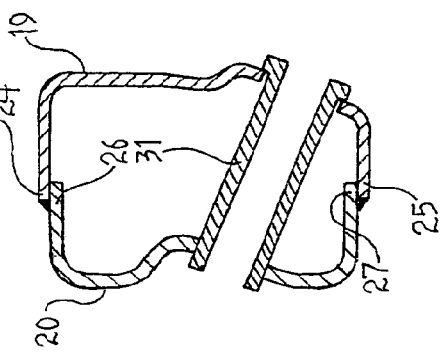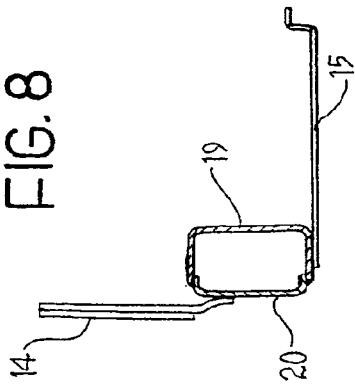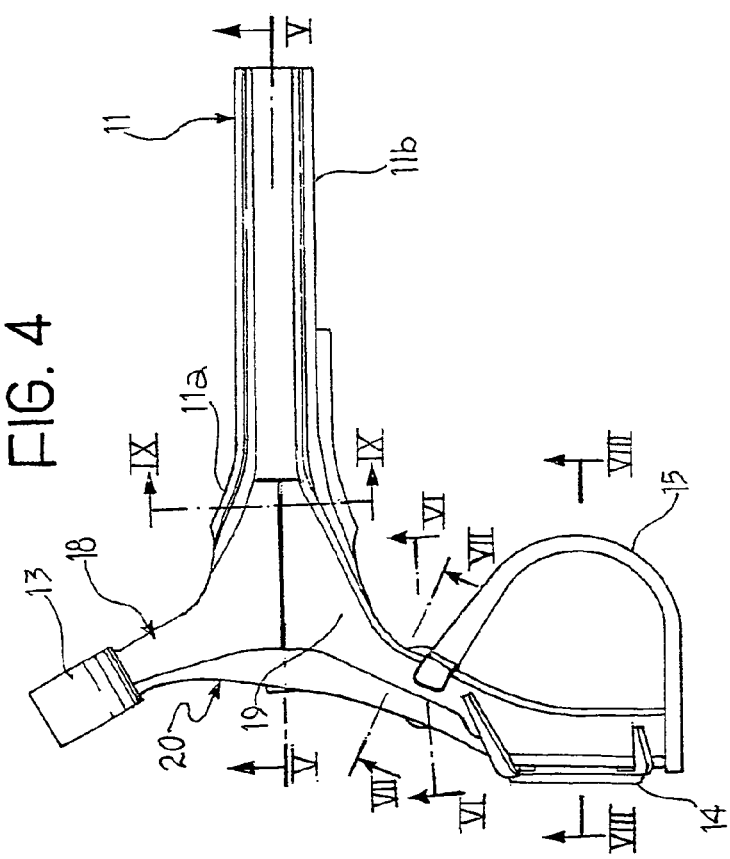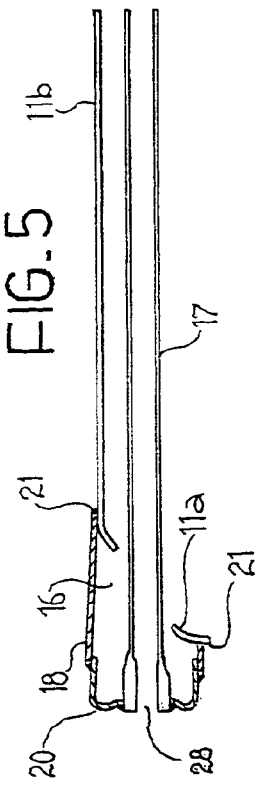

TWIST-BEAM AXLE FOR THE REAR SUSPENSION OF A MOTOR VEHICLE AND METHOD FOR ITS PRODUCTION

This is a National Stage entry of International Application PCT/EP2003/012337, with an international filing date of Nov. 5, 2003, which was published as Publication WO 2004/041561 A1, and the complete disclosure of which is incorporated into this application by reference.

BACKGROUND OF THE INVENTION

The present invention relates to a twist-beam axle for the rear suspension of a motor vehicle, as well as a method for the production of such a twist-beam axle.

It is known in the automotive field the use of rear suspensions in which the two rear wheels are interconnected by means of a twist-beam axle comprising basically a central cross-member compliant to torsion, which extends substantially transversely and a pair of rigid trailing arms, attached to the ends of the cross-member, which support the rear wheels and provide the articulation of the axle to the vehicle body.

According to the prior art, the trailing arms of the twist-beam axle are formed as elongated integral bodies, for example of tubular shape, which are securely connected to the cross-member, for example by welding. Alternatively, a pair of trailing half-arms, that is, a front half-arm and a rear half-arm, respectively, may be provided for instead of a single trailing arm, wherein usually the rear half-arm is formed as a single piece with the cross-member whereas the front one is fixed to the cross-member, for example by welding. These known arrangements, which require a welded joint to be provided between the trailing arms, or the half-arms, and the cross-member, require a high dimensional and shape precision in the welding zones, in order to ensure the correct relative positioning of the parts to be connected and the strength of the welded connection.

A twist-beam axle for the rear suspension of a motor vehicle, including a central cross-member and a pair of trailing arms fixed to respective side end portions of the cross-member (11) is known from EP-A-0 743 205. According to this known solution, each trailing arm comprises a pair of transversely inner half-shells, that is, a front half-shell and a rear half-shell, respectively, which are formed by prolongations of the respective end portion of the cross member, and a transversely outer half-shell securely connected to the pair of transversely inner half-shells so as to form therewith a structure having a closed cross-section.

SUMMARY OF THE INVENTION

It is the object of the present invention to provide an improved twist-beam axle for the rear suspension of a motor vehicle with respect to the prior art, which is strong and easy to manufacture and which enables the taking-up of possible plays in the zones of connection between the trailing arms and the cross-member.

This object is fully achieved according to the invention by virtue of a twist-beam axle for the rear suspension of a motor vehicle having the characteristics defined in the first independent claim. According to another aspect of the invention, this object is fully achieved by virtue of a method for the production of a twist-beam axle for the rear suspension of a motor vehicle as defined in the second independent claim.

In short, the invention is based on the idea of providing a twist-beam axle in which each of the two trailing arms is comprised of a pair of first, transversely inner half-shells, that is, a front half-shell and a rear half-shell, respectively, securely connected to each other and to the respective end of the cross-member by welding, and of a second, transversely outer half-shell, securely connected to the first two half-shells by welding so as to form therewith a rigid body having a closed cross-section.

BRIEF DESCRIPTION OF THE DRAWINGS

The characteristics and the advantages of the invention will appear from the detailed description which follows, given purely by way of non-limiting example with reference to the appended drawings, in which:

FIG. 4 is a plan view from above of the portion of twist-beam axle shown in the preceding figures;

FIG. 5 is a section view along line V—V in FIG. 4 of the portion of twist-beam axle shown in the preceding figures;

FIG. 6 is a section view along line VI—VI in FIG. 4 of the portion of twist-beam axle shown in FIGS. 1 to 4;

FIG. 7 is a section view along line VII—VII in FIG. 4 of the portion of twist-beam axle shown in FIGS. 1 to 4;

FIG. 8 is a section view along line VIII—VIII in FIG. 4 of the portion of twist-beam axle shown in FIGS. 1 to 4; and FIG. 9 is a section view along line IX—IX in FIG. 4 of the portion of twist-beam axle shown in FIGS. 1 to 4.

DETAILED DESCRIPTION OF THE INVENTION

Figure 1:
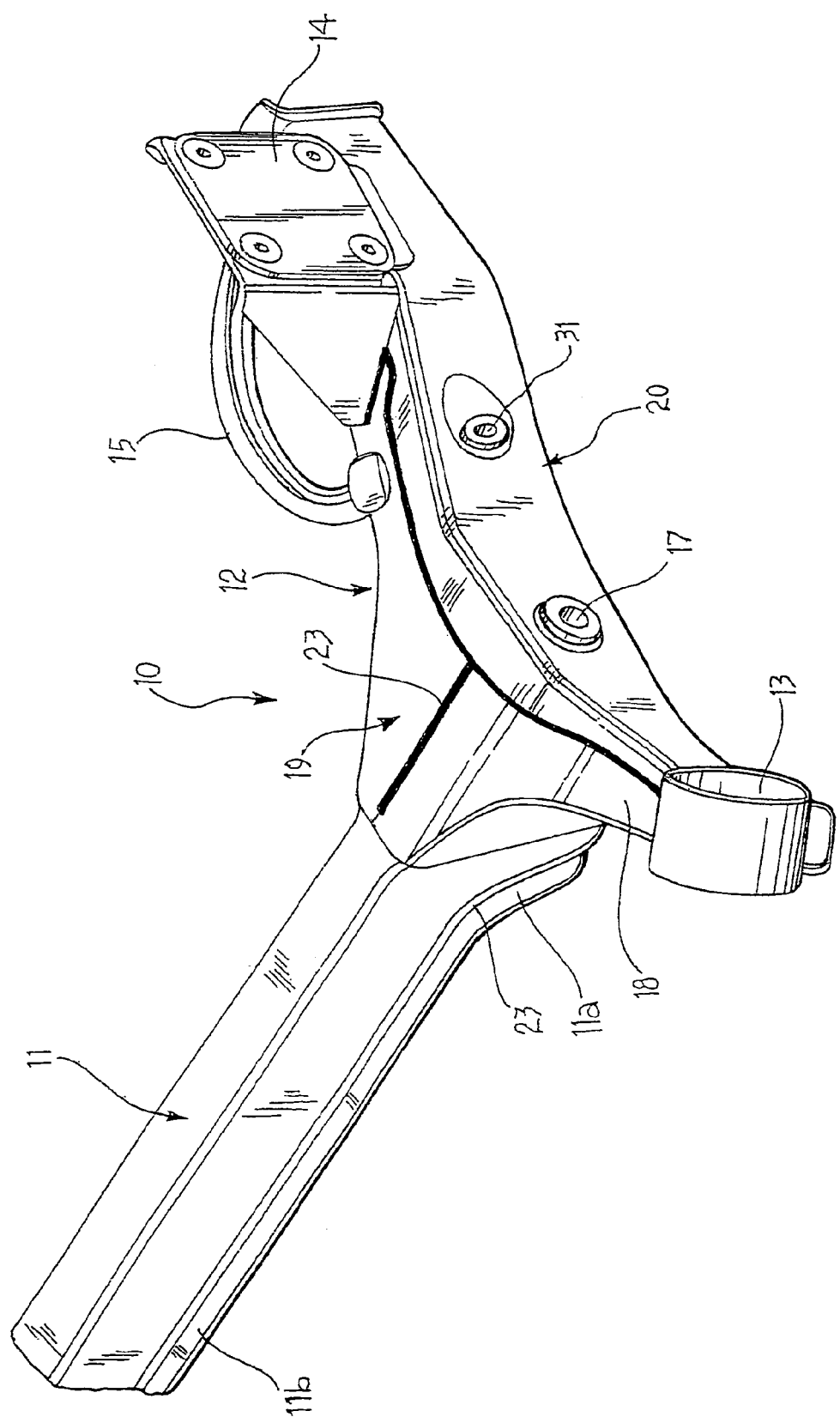
FIGS. 1 and 2 are perspective views from above and from below, respectively, of a side end portion of a twist-beam axle according to the invention.
Figure 2:
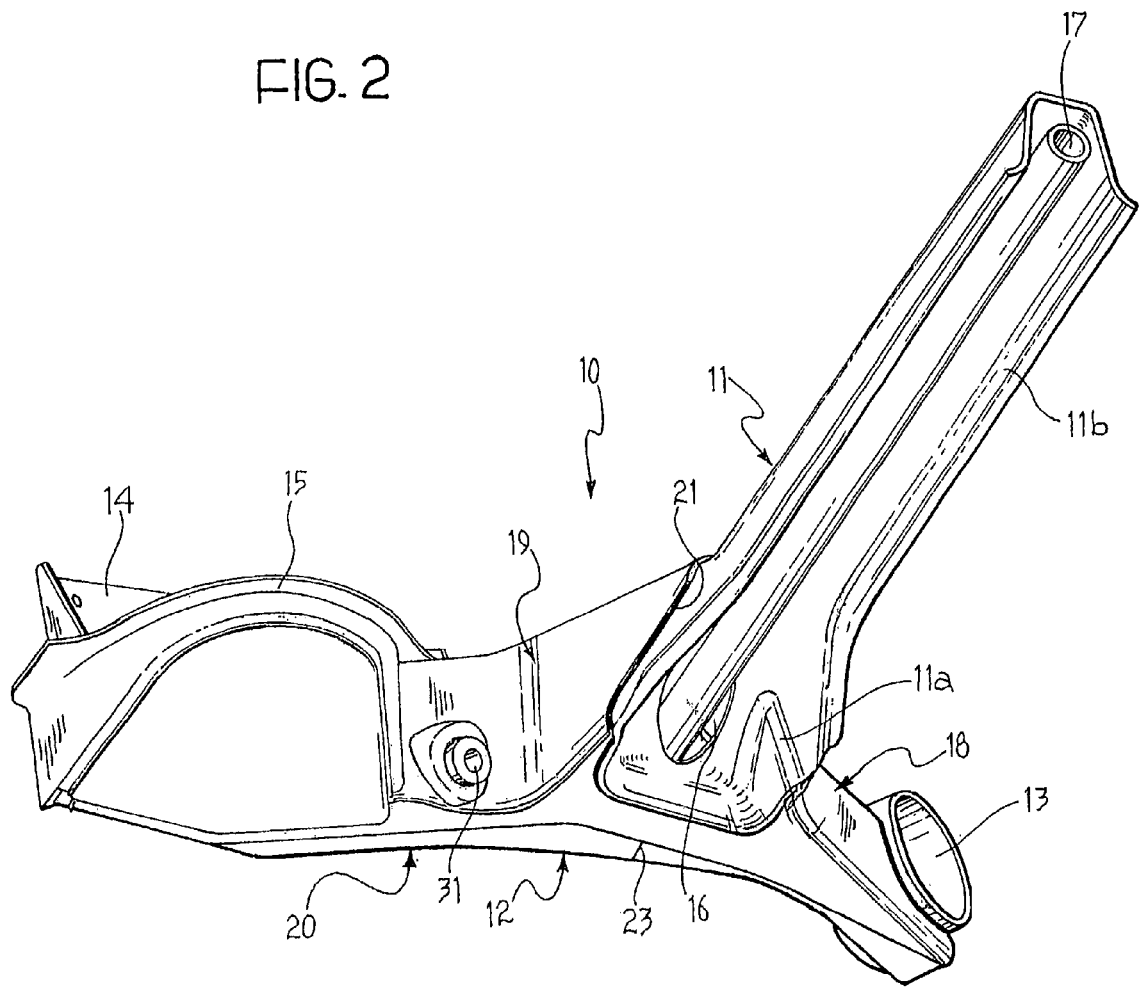

In the description and the claims which follow, terms such as "longitudinal" and "transverse", "inner" and "outer", "front" and "rear" are to be understood as referred to the mounted condition on the vehicle.

Although only one of the two symmetric parts forming the structure of the twist-beam axle in question has been described and illustrated, for clear reasons of simplicity, it is clearly understood that the non-described part is to be considered symmetric, or substantially symmetric, to that described.

By referring initially to FIGS. 1 to 4, a twist-beam axle for the rear suspension of a motor vehicle is generally indicated 10 and comprises a central cross-member 11 and a pair of trailing arms 12 fixed to respective side end portions 11a of the cross-member (in the figures only the left-hand end is shown). A bush 13 for articulation of the twist-beam axle 10 to the vehicle body is fixed to the front end of each trailing arm 12, whereas on a mounting structure 14 for a wheel-carrier (not shown) and a sheet plate 15 intended to provide a lower support surface for a spring (also, not shown) are fixed to the rear portion of the arm 12, on the transversely outer side and the transversely inner side, respectively.

The middle portion of the cross-member 11, indicated 11b, has in its vertical plane of symmetry a cross-section of predetermined shape, in the illustrated example an omega-shape, adapted to provide the cross-member with the required elastic characteristics, in particular the compliance to torsion. The end portions 11a of the cross-member 11 form each a head wall 11c, downwardly inclined in the transverse direction, in which a hole 16 is provided for being passed through by a torsion bar 17 housed inside the middle portion 11b of the cross-member 11 and fixed at its ends to the trailing arms 12. Alternatively, the torsion bar 17 may be fixed to the head walls 11c of the side portions 11a of the cross-member, instead of being fixed to the trailing arms 12. Moreover, the middle portion 11b of the cross-member may assume obviously any other suitable shape, either open (as in the illustrated example) or closed.

According to the invention, each trailing arm 12 is comprised of three sheet metal parts 18, 19 and 20, formed as half-shells with open, essentially C-shaped cross-section, securely connected to each other, preferably by welding. These elements are a pair of transversely inner half-shells 18 and 19, that is, a front half-shell and a rear half-shell, respectively, intended to be fixed to the end portion 11a of the cross-member 11, and a transversely outer half-shell 20, intended to be fixed to the two inner half-shells 18, 19 so as to close the cross-section of the arm 12.

Figure 3:
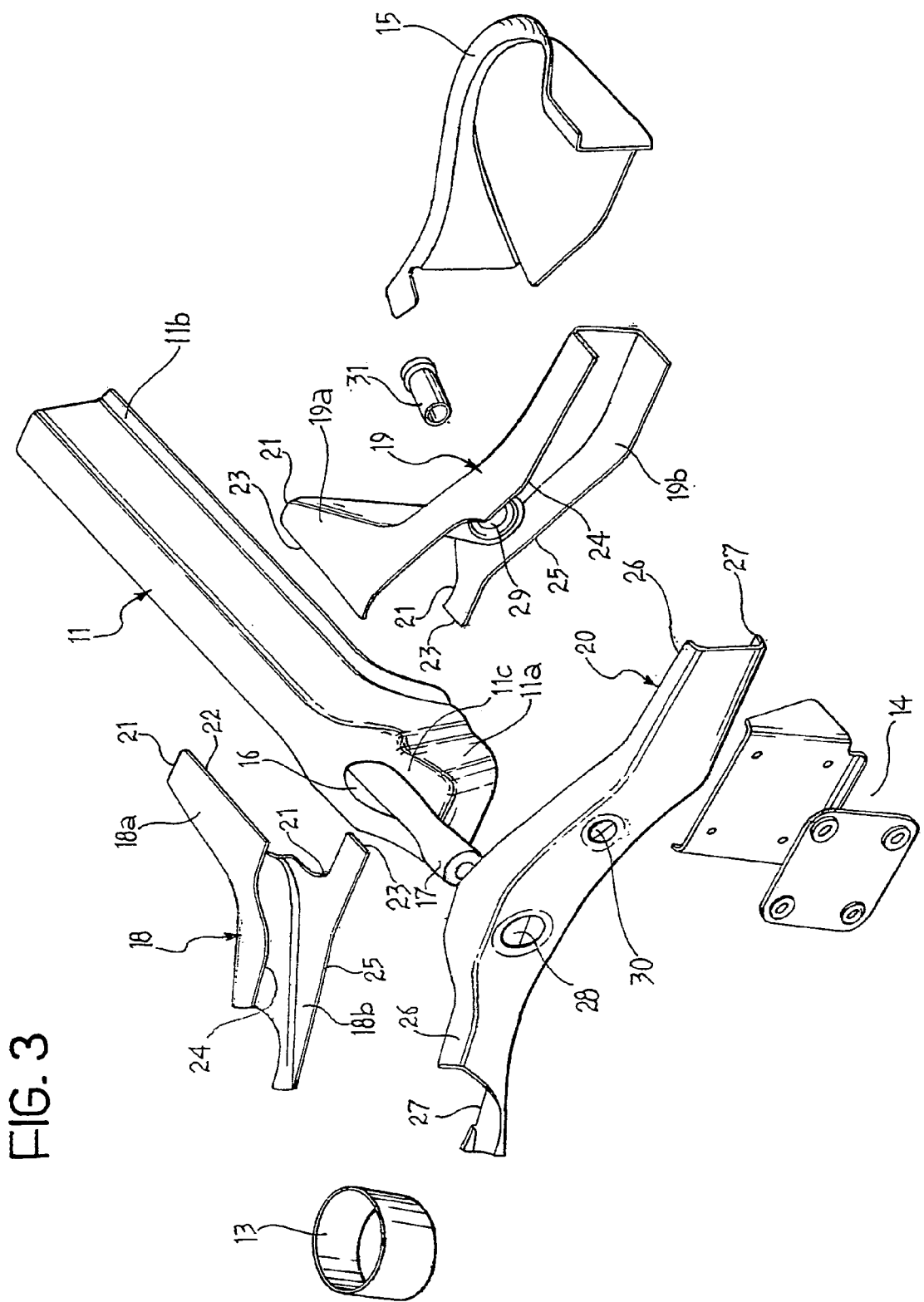
FIG. 3 is an exploded perspective view of the portion of twist-beam axle shown in FIGS. 1 and 2.

Each of the two inner half-shells 18, 19 comprises a first limb 18a, 19a which extends essentially transversely and a second limb 18b, 19b, integral with the first one, which extends essentially longitudinally or is slightly inclined outwards relative to the longitudinal direction (FIG. 3).

Each first limb 18a, 19a is arranged to be welded both to the respective end portion 11a of the cross-member, along a transversely inner edge 21 suitably shaped to fit to the cross-member portion 11a, and to the other first limb 19a, 18a, along a pair of transverse straight edges 22, 23 that is, an upper edge and a lower edge, respectively, arranged in use facing each other. Each second limb 18b, 19b is arranged to be welded to the outer half-shell 20 along a pair of transversely outer edges 24, 25 that is, an upper edge and a lower edge, respectively.

In order to enable to take up possible plays between the two inner half-shells 18, 19 and the cross-member portion 11a, the two half-shells are shaped and dimensioned in such a manner that, when they are arranged in their mounting position on to the cross-member, their facing edges 22, 23 are spaced apart by a certain gap, though very little, which is then filled by the welding bead which joins the two half-shells together along the edges 22, 23 during the assembling of the axle.

Each transversely outer half-shell 20 has a substantially C-shaped cross-section, the upper and lower horizontal walls of which form transversely inner edges 26 and 27, that is, an upper edge and a lower edge, respectively, for connection by welding to the transversely outer edges of the longitudinal limbs of the half-shells 18, 19. Where the torsion bar 17 is fixed to the trailing arms 12, as in the illustrated embodiment, the vertical walls of the outer half-shells 20 have respective holes 28 for engaging the ends of the bar 17.

As can be seen in the exploded view of FIG. 3 and in the section view of FIG. 6, each rear inner half-shell 19 and each outer half-shell 20 have respective through holes 29 and 30 into which a pin 31 is inserted for fixing the lower end of a damper (not shown).

As will be clear in the light of the preceding description, the method of production of a twist-beam axle according to the invention provides for, first of all, the manufacturing of the single parts of the axle, that is to say, the cross-member 11, the torsion bar 17 and the half-shells 18 to 20 intended to compose the trailing arms 12, and then the assembling of these parts by welding the pairs of inner half-shells 18, 19 onto the cross-member 11 and the outer half-shells 20 onto the pairs of inner half-shells of the respective trailing arms.

Since the joining edges 21 to 27 of the half-shells 18 to 20 extend essentially in two dimensions, instead of three dimensions, the welding operations are easy to perform.

Naturally, the principle of the invention remaining unchanged, embodiments and manufacturing details may vary widely from those described and illustrated purely by way of non-limiting example.

What is claimed is:

1. Twist-beam axle for the rear suspension of a motor vehicle, comprising a central cross-member (11) and a pair of trailing arms (12) fixed to respective side end portions (11a) of the cross-member (11), wherein each trailing arm (12) comprises a pair of front and rear transversely inner half-shells (18, 19) fixed to the respective side end portion (11a) of the cross-member (11) and a transversely outer half-shell (20) securely connected to the transversely inner half-shells (18, 19) so as to form therewith a rigid body having a closed cross-section, characterised in that the transversely inner half-shells (18, 19) are separate components from the cross-member (11) and are securely connected to each other and to the respective side end portions (11a) of the cross-member (11).

2. Twist-beam axle according to claim 1, characterised in that each of the transversely inner half-shells (18, 19) comprises a first essentially transverse limb (18a, 19a) which is securely connected to the respective side end portion (11a) of the cross-member (11) and to the other transversely inner half-shell (19, 18) of the same trailing arm (12), and a second essentially longitudinal limb (18b, 19b), integral with the first (18a, 19a), which is securely connected to the transversely outer half-shell (20) of the trailing arm (12).

3. Twist-beam axle according to claim 2, characterised in that the first and second limbs (18a, 18b; 19a, 19b) of the transversely inner half-shells (18, 19) and the transversely outer half-shells (20) have, at least over part of their length, a substantially C-shaped cross-section, the upper and lower horizontal walls of which form respective first joining edges (22, 23; 24, 25; 26, 27), facing two by two, for connection of the front and rear transversely inner half-shells (18, 19) to each other and to the transversely outer half-shell (20).

4. Twist-beam axle according to claim 2, characterised in that the first limbs (18a, 19a) of each pair of transversely inner half-shells (18, 19) form, on the transversely inner side, respective second joining edges (21) for connection of the said half-shells to the respective side end portion (11a) of the cross-member (11).

5. Twist-beam axle according to claim 1, characterised in that the half-shells (18, 19, 20) of each trailing arm (12) are securely connected to each other by welding and in that the transversely inner half-shells (18, 19) of each trailing arm (12) are securely connected to the respective side end portion (11a) of the cross-member (11) by welding.

6. Twist-beam axle according to claim 3, characterised in that in the said first facing joining edges (22, 23) for connection of the front and rear transversely inner half-shells (18, 19) to each other are spaced apart by a gap filled by a welding bead.

7. Twist-beam axle according to claim 1, characterised in that the cross-member (11) has, in its vertical plane of symmetry, an omega-shaped cross-section.

8. Twist-beam axle according to claim 7, characterised in that the axle comprises also a torsion bar (17) housed inside the cross-member (11) and fixed at its ends to the transversely outer half-shells (20) of the trailing arms (12).

9. A method for the production of a twist-beam axle (10) for the rear suspension of a motor vehicle, comprising the steps of:

a) providing a cross-member (11) having side end portions (11*a*) adapted to engage a pair of trailing arms (12);

b) providing, for each side end portion (11*a*) of the cross-member (11), a pair of front and rear transversely inner half-shells (18, 19) adapted to be securely connected to each other and to the side end portion (11*a*) of the cross-member (11), and a transversely outer half-shell (20) adapted to be securely connected to the pair of transversely inner half-shells (18, 19) so as to form therewith a rigid body of closed cross-section;

c) securely connecting the pairs of transversely inner half-shells (18, 19) onto the respective side end portions (11*a*) of the cross-member (11);

d) securely connecting the transversely outer half-shells (20) onto the respective pairs of transversely inner half-shells (18, 19).

10. Method according to claim 9, characterised in that the step b) comprises the operation of forming both the front and rear transversely inner half-shells (18, 19) in such a way that they comprise each a first essentially transverse limb (18*a*, 19*a*) adapted to be securely connected to the respective side end portion (11*a*) of the cross-member (11) and to the other transversely inner half-shell (19, 18) of the same trailing arm (12), and a second essentially longitudinal limb (18*b*, 19*b*), integral with the first (18*a*, 19*a*), adapted to be securely connected to the transversely outer half-shell (20) of the trailing arm (12), wherein the said first and second limbs (18*a*, 18*b*; 19*a*, 19*b*) of each pair of transversely inner half-shells (18, 19) and each transversely outer half-shell (20) have, at least over part of their length, a substantially C-shaped cross-section, the upper and lower horizontal walls of which form respective first joining edges (22, 23; 24, 25; 26, 27), adapted to be disposed facing two by two for connection of the front and rear transversely inner half-shells (18, 19) to each other and to the transversely outer half-shell (20), and wherein the first limbs (18*a*, 19*a*) of each pair of transversely inner half-shells (18, 19) form, on the transversely inner side, respective second joining edges (21) for connection of the transversely inner half-shells to the respective side end portion (11*a*) of the cross-member (11).

11. Method according to claim 10, characterised in that the steps c) and d) comprise the operation of welding the said first and second joining edges (22, 23; 24, 25; 26, 27; 21).

* * * * *